United States Patent [19]

Aaronson et al.

[11] 3,868,499
[45] Feb. 25, 1975

[54] SPECTROMETRIC APPARATUS

[75] Inventors: Charles D. Aaronson, Acton; John F. Rendina, Boxborough; Robert D. Fancy, Oakdale, all of Mass.

[73] Assignee: GCA Corporation, Bedford, Mass.

[22] Filed: Mar. 25, 1974

[21] Appl. No.: 454,589

[52] U.S. Cl............. 235/151.35, 356/100, 250/339, 356/98, 235/92 MT
[51] Int. Cl............................ G01j 3/06, G06f 1/00
[58] Field of Search....... 235/151.3, 151.35, 92 MT, 235/92 EV, 92 CA; 356/96, 97, 99, 100, 51, 98; 250/339, 373

[56] References Cited
UNITED STATES PATENTS

| | | | |
|---|---|---|---|
| 3,349,241 | 10/1967 | Schmitt et al...................... | 356/51 X |
| 3,457,412 | 7/1969 | Cary................................. | 356/51 UX |
| 3,588,462 | 6/1971 | Kreckel........................... | 235/92 EV |
| 3,588,496 | 6/1971 | Snowman........................ | 356/51 X |
| 3,659,945 | 5/1972 | Roche et al...................... | 356/100 |
| 3,695,764 | 10/1972 | Delmas et al................... | 356/100 X |
| 3,704,953 | 12/1972 | Carter et al..................... | 356/100 X |

FOREIGN PATENTS OR APPLICATIONS 713,288   8/1954   Great Britain...................... 356/100

Primary Examiner—Eugene G. Botz
Assistant Examiner—Edward J. Wise
Attorney, Agent, or Firm—Kenway & Jenney

[57] ABSTRACT

In the spectrometric apparatus disclosed herein, a monochromator provided with a stepping motor drive is controlled in a sequence of scanning operations by a memory which can be loaded by means of simple punch cards. The memory holds a plurality of multi-bit digital words, each word comprising a first portion which can designate a rate of scan and a second portion which can designate a destination value, stated in terms of wavelength. Each stored digital word also includes a plurality of control bits which affect the operation of the spectrometric apparatus and which can also be used for controlling apparatus external to the monochromator, e.g. a strip chart recorder.

9 Claims, 1 Drawing Figure

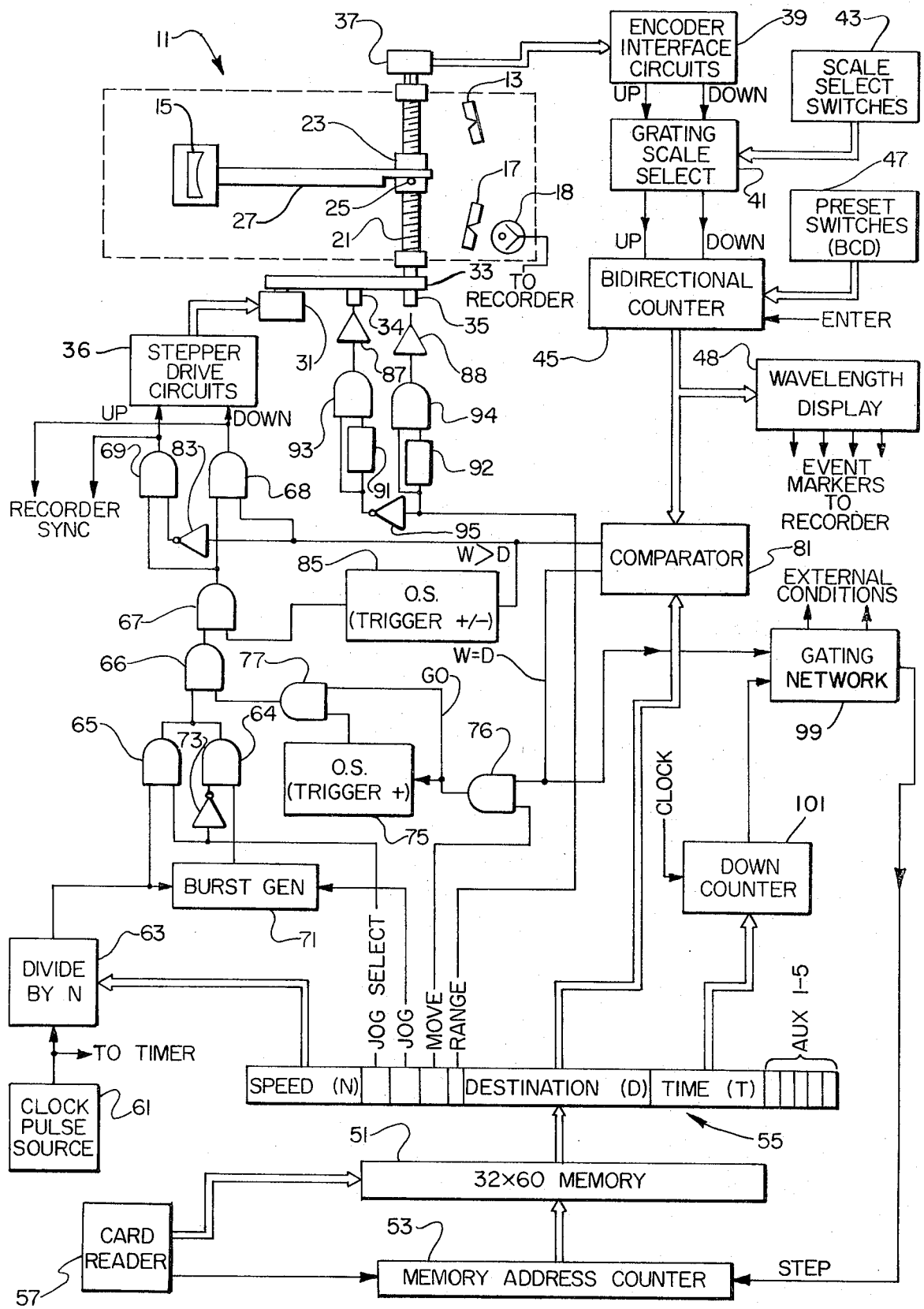

SPECTROMETRIC APPARATUS

BACKGROUND OF THE INVENTION

This invention relates to spectrometric apparatus and more particularly to such apparatus which will automatically execute a sequence of wavelength scanning operations at respective preselected scan rates.

Various prior art systems have been proposed heretofore in which a monochromator or other spectrometric apparatus is operated under the control of a general-purpose, stored-program computer, e.g. of the type usually referred to mini-computers. While such systems constitute a powerful and flexible tool for various analysis and process-control functions, they are quite expensive as compared with conventional, manually-controlled analyzers. Further, such systems require an operator versed in the programming arts to oversee the operation of the system and to set up the various problems and operations to be performed by the apparatus.

Among the several objects of the present invention may be noted the provision of spectrometric apparatus which will automatically perform a sequence of wavelength scanning operations, the range of wavelengths to be scanned and the rate of scan for each such operation being freely preselectable; the provision of such apparatus in which the sequence of operations can be quickly and easily modified; the provision of such apparatus which can be operated without requiring computer programming skills; the provision of such apparatus which is highly reliable and which is of relatively simple and inexpensive construction. Other objects and features will be in part apparent and in part pointed out hereinafter.

SUMMARY OF THE INVENTION

Briefly, spectrometric apparatus in accordance with the present invention employs means for analyzing radiation as a function of wavelength, the wavelength setting being variable by means of a stepping motor. The analyzing means also includes means for generating up/down pulses corresponding to changes in the wavelength setting of the analyzing means. An up/down counter responds to the up/down pulses for varying the count held by the counter in correspondence with changes in the wavelength setting of the analyzing means. The apparatus also employs an addressable memory adapted to hold a plurality of multi-bit digital words. A destination register is loaded from the memory and a comparator, interconnected with the counter and the destination register, operates to provide a coincidence signal when the values in the counter and the destination register are equal. The comparator also provides a direction signal indicating which of the values is larger if they are not equal. A rate register is also loaded from the memory and a divider circuit is controlled by the rate register to provide, from a source of clock pulses, a series of driving pulses which are related to the clock frequency by a factor corresponding to the value held in the rate register. Gating means, interconnected with the comparator, controls the application of the driving pulses to the stepping motor, the pulse being applied to the motor in a sense controlled by the direction signal. The application of driving pulses is then terminated when the values held in the up/down counter and the destination register are equal. Words in the memory are sequentially addressed, e.g. each successive word being addressed upon the completion of the previous operation or scan, thereby to direct the analyzing means in the performance of a sequence of freely preselectable scanning operations.

BRIEF DESCRIPTION OF THE DRAWING

The single FIGURE is a diagram, partially in schematic form, illustrating spectrometric apparatus in accordance with the present invention.

DESCRIPTION OF THE PREFERRED EMBODIMENTS

Referring now to the drawing, there is indicated at 11 generally a monochromator of essentially conventional construction. Radiation to be analyzed enters through an entrance slit 13 and is dispersed by a grating 15, radiation of selected wavelength then exiting through an exit slit 17. A detector 18 appropriate for the wavelengths under consideration is mounted behind the exit slit 17.

In the apparatus illustrated, the wavelength setting of the monochromator 11 is changed by varying the orientation of the grating 15. For this purpose, a lead screw 21 is provided which drives the traveler 23. The traveler 23 carries a spherical element 25 which, in turn, bears on the flat surface of a sine bar 27 which is coupled to the grating mounting so as to control the orientation of the grating 15 around an axis perpendicular to the plane of the drawing. As is understood, a cam (not shown) may be provided for coupling a longitudinal motion to the grating so as to maintain exact focus during scanning. A stepping motor 31 drives lead screw 21 through a two-speed gear train 33. In one embodiment of the invention, the gearing ratios differed by a factor of 50 to 1, each speed range being selectable by energization of a respective clutch 34 or 35. Stepper motor 31 is energized by conventional stepper drive circuits, designated 36, which respond to up or down pulses on respective input lines to produce clockwise or counter clockwise rotation of the motor 31.

Lead screw 21 also drives an incremental shaft encoder 37. Together with appropriate encoder interface circuits, indicated generally at 39, the encoder 37 operates to provide up/down pulses signalling changes in the position of the lead screw 21. The rate at which the up/down pulare generated is proportional to the rate of change of wavelength, though not directly representative of such changes. In the embodiment illustrated, the "up" pulses are provided on one line while "down" pulses are provided on a separate line. As will be understood by those skilled in the art, up and down pulses could both be provided on a single line if a direction signal, indicating whether the pulses represented rotation in the up direction or the down direction, were provided on a separate line. While an incremental shaft encoder has been shown by way of example, it should be understood that an absolute encoder might also be used.

As explained in greater detail hereinafter, instructions to the apparatus are, for the convenience of the operator, stated in terms of wavelength rather than in terms of angular position of the lead screw 21. Thus, the person operating the spectrometric apparatus can define and construct sequences and analyzing procedures in terms which are most meaningful to him. As different gratings will typically have different rates or ratios of wavelength change to lead screw rotation, the pulse signals provided by the encoder and its interface circuitry are applied to a dividing circuit 41 which operates to scale the pulse rates. Circuitry 41 operates to divide the pulse rates of the up/down pulses by a factor which can be preselected by means of manual scale select switches, indicated at 43. As will be understood, the factor is chosen so that the scaled-down rate will correspond to actual changes in wavelength.

After scaling to obtain correspondence of pulse rate with wavelengths that change, the up/down pulses are applied to a bi-directional counter 45, changes in the value held in counter 45 being thus representative of changes in the operating wavelength of the monochromator 11. In order to permit the initial value held in the counter 45 to be set in correspondence with the actual operating wavelength of the monochromator 11, an initial value can be preset in the counter by means of manual preset switches 47, this value being entered into the counter when an appropriate enter signal is applied, e.g. by means of a manual push button. As will be understood, the preset switches can be used to set the counter either to a value corresponding to the absolute wavelength or to an arbitrary setting so that the value held in the counter then represents the change or difference ($\Delta$) from an arbitrary reference wavelength value. Preferably, both the preset switches and the bi-directional counter are constructed so as to operate in the BCD (binary-coded-decimal) mode so that wavelengths are conventionally expressed in decimal form, readily utilized by the operator of the apparatus.

Preferably, the value held in counter 45 is also displayed, as indicated at 48, to provide to the operator a current wavelength reading for the apparatus. The value may also be provided to recording or other data acquisition apparatus in conventional manner, together with the output signal obtained from the detector 18 at the output slit of the monochromator. It is also typically useful to provide to the recorder various event markers. These can conveniently be derived from the wavelength display 48 or counter 45 and may merely constitute the carry and borrow pulses generated as the bi-directional counter scans up and down. In addition to being displayed, the wavelength count value held in counter 45 is provided to a comparator 81 where it is compared with a desired or destination wavelength value. As is explained in greater detail hereinafter, the results of the comparison are employed to control the direction of operation of the stepper motor so that the monochromator is driven toward rather than away from the desired wavelength.

As indicated previously, the apparatus of the present invention permits automatic operation to be accomplished from a relatively simple, card-loaded memory, rather than from a comparatively elaborate, general-purpose, stored-program computer. In one embodiment of the invention, a thirty-two word by sixty bit semi-conductor memory was utilized, such a memory being indicated at 51 in the drawing. Memory 51 is organized so that a particular word to be read out is designated by means of an address counter 53. The sixty bit word stored at the address held in counter 53 is then presented at an output register, designated generally as 55. As explained in greater detail hereinafter, each word comprises several fields or portions which control or specify various aspects of the operation of the apparatus of the present invention and may also control various peripheral devices, e.g. a data recorder.

In the embodiment illustrated, one portion of the word comprises a value designating speed of scan (N); another portion represents a wavelength value (D) indicating the destination or end point of the scan; and a third portion or field represents a time value (T). This latter value designates the time within which the operation corresponding to the word may or should be completed. Certain other bits in the word determine or control operating states in the apparatus, among these being selection of the speed range (RANGE), the designation of whether the word can cause scanning of the monochromator at all (MOVE), whether the device is to function in a jog mode (JOG MODE), whether a jog is to be executed (JOG), and whether various outside or peripheral functions are to be executed (AUX 1–5). Memory 51 is conveniently loaded by a manually-operated, optical card reader designated by reference character 57 in the drawing. In one embodiment of the invention, the card reader 57 and memory 51 together with appropriate interconnecting circuitry were those available from the Sunnyvale division of G. C. A. Corporation of Sunnyvale, California, as their model 23915 controller.

Driving pulses for the stepper motor are derived from a clock pulse source 61 providing a pulse train at a predetermined, relatively high frequency. This pulse frequency may be derived either from the supply line frequency or from a separate stable oscillator. The clock pulse train is applied to a so-called divide-by-N circuit 63 which operates to divide the pulse train frequency by a factor N, where N is a value determined by the corresponding portion or field of the memory word presented at the memory output register 55.

The pulse train at the scaled-down frequency is applied to the stepper drive circuitry 36 through a succession of gates 64–69 which condition the passage of the pulse train on various control states, i.e., as set by control bits in the then-operative memory word, as well as on the occurrence of certain transitions in the operating status of the overall device. The pulse train is passed by the gate 65 unless the apparatus is in a "jog select" mode in which case pulses can be passed from a burst generator 71 through a gate 64. Gate 64 is controlled by the complement of the jog select signal, obtained through an inverter 73. If the apparatus is in the jog select mode and the jog bit is present in the memory word, the burst generator is triggered. When triggered, the burst generator passes a predetermined number, e.g. ten, of the drive pulses.

While, in this description, the value N is treated as the factor by which the clock pulse rate is divided, it should be understood that this value may also be encoded as a binary or decimal number directly representing rate or, with appropriate scale correction of change of wavelength, e.g. in nanometers per minute scan rate using circuits such as decimal rate multipliers.

As indicated previously, the direction of rotation of the stepper motor is determined by the relative magnitudes of the wavelength value held in the counter 45 and the wavelength destination, i.e., that portion of the output word which determines the end point of the scan to be executed. This comparison is made in the comparator 81 which provides a signal, designated W=D when the counter value W is equal to the destination value D. Comparator 81 also provides a signal which indicates which of the values is the larger when they are not equal. In the embodiment illustrated, this signal is designated W>D and is positive when W is greater than D. As is understood, comparators of this type typically also provide a signal indicating when the opposite situation exists, i.e., when D>W, but in the present application, it is sufficient to use just one of these signals and its complement, rather than both. The signal W>D is applied directly to one input of the gate 68 to allow the pulse train to drive the stepper motor in the down direction when the wavelength value is greater than the destination value. Conversely, the complement of the W>D signal, obtained through an inverter 83, is applied to the gate 69 to allow the pulse train to advance the stepper motor so as to increase wavelength when the destination value is greater than the wavelength value. As will be understood, the directional control signal can also be logically based upon the status of limit switches within the monochromator so as to prevent any attempt to drive the monochromator beyond its normal range of operation, although these details are not described in connection with the illustrative embodiment shown.

As illustrated, the W<D signal is combined with the MOVE signal in a gate 76 to obtain a signal which is designated GO. The GO signal is applied through a gate 77 to the gate 66 which can cut off the supply of drive pulses to the stepper motor. Accordingly, the supply of drive pulses will be terminated when the wavelength value reaches the destination value, approaching from either direction. The GO signal is also applied to trigger a one-shot multivibrator 75 when the GO state is first initiated. The output of the one-shot multivibrator 75 is combined with the GO signal in the gate 66 so as to delay the application of stepper drive pulses when movement is first initiated. This delay is for the purpose of allowing other changes in the status of the apparatus to reach equilibrium before the stepping motor is started.

The direction signal (W>D) obtained from the comparator is also applied to a one-shot multivibrator or delay circuit 85 which is arranged so as to be triggered by either positive-going or negative-going transitions in the direction signal. The output signal from this delay circuit controls gate 67 so as to block the pulse train for a predetermined interval following any change in direction. This delay again allows transitions in the status of the apparatus to reach equilibrium before the pulse train can again energize the stepper motor drive circuits.

In addition to varying the speed of scanning of the monochromator by changing the divider value N, the speed can also be varied between two speed ranges by the two-speed gear train 33. For this purpose, the control word obtained from the memory includes a bit, designated RANGE which controls which of the two clutches 34 or 35 is energized. The RANGE signal is applied to respective clutch drive amplifiers 87 and 88 through delay circuits each comprising a one-shot multivibrator, 91 and 92 respectively, and gates, 93 and 94 respectively. The RANGE signal is applied to one of the circuits directly and to the other through an inverter 95. As will be understood, the RANGE signal thus causes one of the other of the clutches to be energized. However, upon any change in the state of the RANGE signal, energization of the newly selected clutch is delayed by a predetermined interval determined by the respective delay circuit 91 or 92. This delay again allows mechanical components to reach equilibrium. In addition to providing various control bits and designating the speed and wavelength destination of a scan, each control word obtained from the memory includes a portion or field which designates the time (T) for execution of the operation defined by the digital word. As each digital word is called out from the memory, the value T is loaded into a down counter 101 and, immediately following this loading, the counter is released so as to be free to count. Counter 101 counts down, driven by the clock pulse train, and, at the end of T counts, provides a signal, designated the END T signal.

In addition to providing a basis terminating the GO signal, the W=D signal generated by comparator 81 also provides one basis for generating a STEP signal which advances the address register 53 so as to bring a new data word out of the memory. For this purpose, the W<D signal is combined with various other external conditions sense signals and the END T signal in a gating network, indicated generally at 99. As will be understood, the gating network can be configured in various ways so that any available signal can be used to either initiate, condition or inhibit generation of the STEP signal which causes the apparatus to proceed on to its next stored instruction.

In use, the operator of the apparatus can set up an experiment or monitoring procedure comprising a plurality of scans at various scan rates by merely coding appropriate instruction words on punch cards. As various bits are included in the word for the control of outside functions, steps can be included which only cause external operations, scanning being suspended. Examples of such operations may be the incrementing of a filter wheel, the advancing of a sample changer, changes in source intensity, and the like.

As may be seen from the foregoing description, a word called forth from the memory can cause the monochromator 11 to scan from its then existing wavelength setting to a new, preselectable setting, the rate of scan being freely selectable by designation of the scan rate value N and the speed range selection. Since the apparatus includes provision for controlling outside devices, e.g. a recorder and light source, the monochromator can be slewed at relatively high speed over ranges which are not of interest to pre-position the wavelength setting at a predetermined starting point for the next scan and, during this high speed slewing, the recording of data can be suspended.

Further, since the device includes a timer for preselecting the time for execution of each step, the operator can program delays in the sequence, e.g. to allow an experiment to progress or to allow completion of an operation external to the present apparatus, e.g. the stepping of a filter wheel or the like.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Spectrometric apparatus comprising:
   means for analyzing radiation as a function of wavelength including stepping motor means for varying the wavelength, said analyzing means having means for providing up/down pulses corresponding to changes in the setting of said analyzing means;

an up/down counter responsive to said up/down pulses for varying the count held by said counter in correspondence with changes in the wavelength setting of said analyzing means;

addressable memory adapted to hold a plurality of multi-bit digital words;

a destination register which can be loaded from said memory;

a comparator interconnected with said counter and said destination register and operative to provide a coincidence signal when the values in said counter and destination register are equal and a direction signal indicating which of said values is larger if they are not equal;

a rate register which can be loaded from said memory;

a source of clock pulses at a predetermined frequency;

a divider circuit interconnected with said rate register and driven from said clock pulse source for providing driving pulses at a rate which is related to said predetermined frequency by a factor corresponding to the value held in said rate register; gating means interconnected with said comparator means for applying said driving pulses to said stepping motor in a sense controlled by said direction signal, the application of driving pulses being terminated when the values held in said counter and said destination register are equal; and means for loading said registers with values determined by respective portions of a word held in said memory, the words in the memory being sequentially addressed thereby to direct said analyzing means in the performance of a sequence of scanning operations.

2. Apparatus as set forth in claim 1 further comprising a card-reader for loading said memory.

3. Apparatus as set forth in claim 1 wherein said means for providing up/down pulses comprises a shaft encoder.

4. Apparatus as set forth in claim 1 wherein said means for providing up/down pulses comprises an incremental shaft encoder together with interface circuitry for providing up pulses on an up line and down pulses on a down line.

5. Apparatus as set forth in claim 1 further comprising means for scaling the rate at which said up/down pulses are delivered by a factor which permits the use of different wavelength analyzing elements in said analyzing means.

6. Apparatus as set forth in claim 5 wherein said analyzing elements are gratings.

7. Apparatus as set forth in claim 1 further comprising a wavelength display for displaying the value held in said up/down counter.

8. Spectrometric apparatus comprising:

means for analyzing radiation as a function of wavelength, said means including a lead screw which is rotated to vary the wavelength setting of the analyzing means;

stepping motor means for selectively driving said lead screw in either direction;

means including a shaft encoder coupled to said lead screw for providing up/down pulses, the rate at which said pulses are generated being a function of the rate at which wavelength is being changed in the respective direction;

an up/down counter responsive to said pulses for varying the count held by said counter in correspondence with changes in the wavelength setting of said analyzing means;

an addressable memory adapted to hold a plurality of multi-bit digital words;

a card-reader for loading said memory;

a destination register which can be loaded from said memory;

a comparator interconnected with said counter and said destination register and operative to provide a coincidence signal when the values in said counter and destination register are equal and a direction signal indicating which of said values is larger if they are not equal;

a source of clock pulses at a predetermined frequency;

gating means interconnected with said comparator means for applying said clock pulses to said stepping motor in a sense controlled by said direction signal, the application of driving pulses being terminated when the values held in said counter and said destination register are equal; and means for loading said register with values determined by a respective portion of successive words held in said memory, the words in the memory being seqentially addressed thereby to direct said analyzing means in the performance of a sequence of scanning operations.

9. Spectrometric apparatus comprising:

means for analyzing radiation as a function of wavelength including stepping motor means for varying the wavelength, said analyzing means having means for providing up pulses on an up line and down pulses on a down line, the rate at which said pulses are generated being a function of the rate at which wavelength is being changed in the respective direction;

an up/down counter responsive to said pulses for varying the count held by said counter in correspondence with changes in the wavelength setting of said analyzing means;

an addressable memory adapted to hold a plurality of multi-bit digital words;

a destination register which can be loaded from said memory;

a comparator interconnected with said counter and said destination register and operative to provide a coincidence signal when the values in said counter and destination register are equal;

a rate register which can be loaded from said memory;

a source of clock pulses at a predetermined frequency;

a divider circuit interconnected with said rate register and driven from said clock pulse source for providing driving pulses at a rate which is related to said predetermined frequency by a factor corresponding to the value held in said rate register;

gating means interconnected with said comparator means for applying said driving pulses to said stepping motor, the application of driving pulses being terminated when the values held in said counter and said destination register are equal; and means for loading said registers with values determined by respective portions of a word held in said memory, the words in the memory being sequentially addressed thereby to direct said analyzing means in the performance of a sequence of scanning operations.

* * * * *

UNITED STATES PATENT OFFICE
CERTIFICATE OF CORRECTION

PATENT NO. : 3,868,499
DATED : February 25, 1975
INVENTOR(S) : Charles D. Aaronson, John F. Rendina & Robert D. Fancy It is certified that error appears in the above-identified patent and that said Letters Patent are hereby corrected as shown below:

Column 1, line 12, after "to", insert --as--;

Column 2, line 45, "pulare" should be --pulses are--;

Column 5, line 22, "W<D" should be --W=D--;

Column 6, line 18, "W<D" should be --W=D--; and on line 23, "ihitiate" should be --initiate--;

Claim 1, Column 7, at the beginning of line 8, insert --an--.

Signed and sealed this 15th day of July 1975.

(SEAL)
Attest:

RUTH C. MASON
Attesting Officer

C. MARSHALL DANN
Commissioner of Patents
and Trademarks